June 30, 1942.     H. LEHDE     2,287,808
APPARATUS FOR DETECTING A DEFINITE COLOR PHASE
DURING THE PROCESSING OF A MATERIAL
Filed June 12, 1940
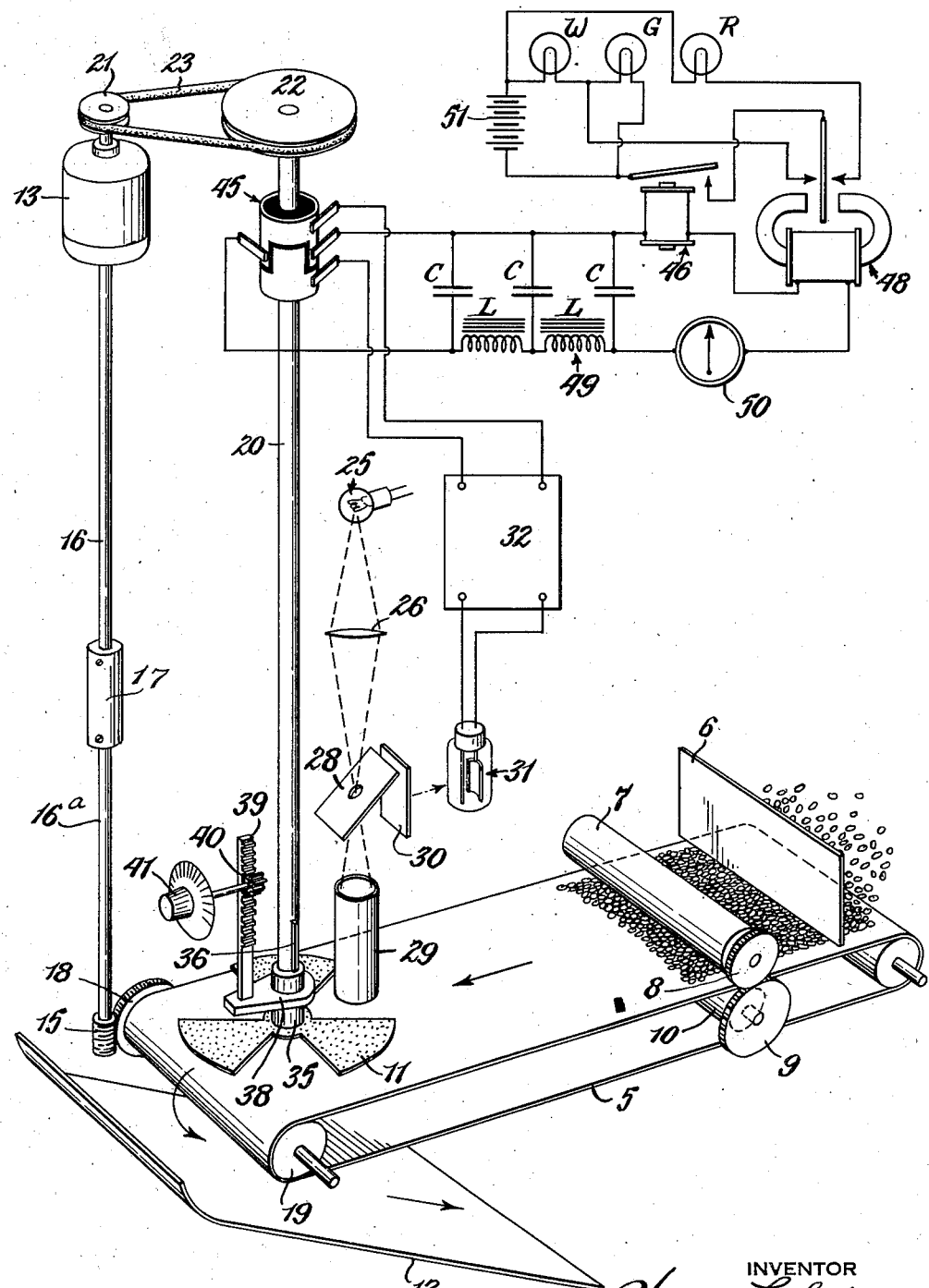
INVENTOR
Henry Lehde,
BY
Popp and Popp
ATTORNEYS Patented June 30, 1942

2,287,808

UNITED STATES PATENT OFFICE 2,287,808

APPARATUS FOR DETECTING A DEFINITE COLOR PHASE DURING THE PROCESSING OF A MATERIAL

Henry Lehde, Brooklyn, N. Y.

Application June 12, 1940, Serial No. 340,212

2 Claims. (Cl. 88—14)

This invention relates to colorimeter apparatus for controlling any process in which it is desired to bring a product to a predetermined color, such as in the baking or roasting of various products to a definite color which is an indication that the process has been completed.

This application is a continuation in part of my copending application for Method and apparatus for detecting a definite color phase during the processing of a material, Serial No. 188,110, filed February 1, 1938.

Heretofore it has been necessary to control such processes by visual examination. This is usually inaccurate and inconvenient and the principal object of the present invention is to provide a very accurate and reliable means of detecting the color phase characteristic of the properly finished product. The detecting means operates to signal the operator that the process is complete, or may be used to automatically operate mechanisms controlling the baking, roasting or other process.

In its general organization the method employed to detect the desired color phase is to project light upon the product under process and to measure the amount of reflected light by means of a photocell, or other light responsive element. While this general organization has been used in the past, the accuracy of the results has been greatly affected by a number of variable factors. Variations in the voltage supply to the photocell and its associated equipment, or in the sensitivity of the photocell, or in the amount of light projected on the product, usually produce changes in the output of the photocell greater than the changes to be detected.

It is an important object of the present invention to provide an apparatus which renders it possible to completely eliminate the effect of all the above variable factors. This is accomplished in accordance with the present invention by causing the apparatus to compare the color of the product under process with that of a standard color surface in such a manner that its response depends only on the color of the standard surface and is entirely independent of all variable factors. Thus the signal is given only when the product reaches a color equivalent to that of the standard color surface.

Another object is to provide a simple adjustment to permit of varying the effect of the standard surface without actually changing the surface or decreasing the precision of the results.

Another object is to provide such an apparatus which is highly accurate in its operation, permanent in its adjustment to any color shade, and reliable and efficient in operation.

Another object is to provide such an instrument which is particularly adaptable to the accurate measurement of extremely small differences in color between samples of any material or product, and in this capacity has a wide field of application.

Other objects are to provide such an apparatus which is relatively inexpensive in construction, simple and compact in design, and easily operated by an inexperienced observer.

The accompanying drawing is a schematic view of the invention, which will be described in connection with the roasting of coffee, although it will be understood that it can be used in a large number of similar processes.

A well known type of coffee roaster consists of a horizontal rotating cylinder heated by a gas flame during the roasting operation. The rotation of the cylinder causes a continuous stream of coffee beans to drop past the circular opening at one end of the rotating cylinder. As heretofore practiced, samples for examination of color were obtained from this stream and were compared with a standard sample of roasted coffee. When the sample from the cylinder matched the standard sample in color, the operator turned off the gas flame, cooled the cylinder by a stream of water to stop the roasting process, and removed the coffee from the cylinder.

The apparatus forming the subject of this invention is employed to continuously remove samples of coffee from such roasting equipment, examine them for color, and return them to the roaster. This apparatus is shown as including a belt conveyor 5 which is so placed with respect to the roaster cylinder (not shown) that a stream of coffee beans falls upon it at one side of a vertical plate 6. As the endless belt 5 moves in the direction shown, the elevation of the vertical plate 6 will regulate the thickness of the layer of coffee beans passing underneath it. A roller 7 is driven by gears 8 and 9, the gear 9 being preferably attached to a roller or sprocket wheel 10 driven by movement of the conveyor belt 5. The purpose of the roller 7 is to smooth out the irregularities in the surface of the layer of coffee beans passing underneath it. As a result of the action of the vertical plate 6 and the roller 7 a smoothed layer of coffee beans of definite height passes underneath a rotating sector disk 11, where it is examined for color, as later described. After examination the layer of coffee beans drops off the conveyor belt 5 and onto an inclined plate 12 which returns them to the coffee roaster.

The conveyor belt 5 is driven by a motor 13. A worm gear 15 is mounted on an extensible shaft extension 16, 16a of the motor, and engages with a worm wheel 18, which is attached to a drive roller or sprocket wheel 19. The two sections of this extensible shaft are connected by a sleeve 17 which is secured to one section and connected to the other section by a set screw so that the sections can be moved lengthwise relative to one another and fixed in any adjusted position. Rotation of the roller 19 moves the conveyor belt 5 in the direction shown.

The rotating sector disk 11 is mounted on a shaft 20 which is driven by the motor 13 through pulleys 21 and 22 and a belt 23. The light source 25 is preferably in the form of an incandescent lamp with a concentrated filament and is focused by means of a condensing lens 26 upon a hole in the back of a mirror 28. This mirror is preferably placed at the upper end of a reflecting tube 29, at an angle of approximately 45° to the axis of the reflecting tube. After passing through the hole the light diverges and strikes the inside of the reflecting tube 29. The inner surface of this tube is highly reflective and practically all the light entering the upper end of the tube emerges from its lower end, after numerous reflections within the tube. As the sector disk 11 rotates, this light alternately strikes upon the layer of coffee beans and upon the blades of the sector disk.

The light reflected from the layer of coffee beans and from the blades of the sector disk is reflected back into the tube 29 and is transmitted up this tube to the mirror 28. At the mirror a small part of this reflected light passes through the hole, but most of the light is reflected from the mirror 28 through a color filter 30, the purpose of which will be later explained. The light then strikes a photocell 31 which is connected to an amplifier 32. If the sector blades and the layer of coffee beans are not of the same color, and do not reflect the same amount of light, it is apparent that there will be a pulsation in the amount of light transmitted to the photocell 31. If the color of the sector disk 11 is made the same as that of completely roasted coffee, there will be a pulsation in the current flowing through the photocell when unroasted coffee passes underneath the sector disk. The photocell current will be a maximum when the light colored unroasted coffee reflects light into the photocell. As the roasting process progresses, the moving layer of coffee gradually darkens in color, causing a decrease in the current pulsations in the photocell. Finally when the layer of coffee beans reflects the same amount of light as the blades of the sector disk 11, the pulsations in the photocell disappear entirely. Further darkening of the layer of coffee beans will again produce pulsations in the photocell. The phase of the current pulsations will then be reversed, because the maximum photocell current now occurs when a sector blade is in front of the reflecting tube 29.

The relative amounts of light reflected by the sector disk 11 and the layer of coffee beans into the lower end of the tube 29 will depend to some extent on the distance of each of these objects from the end of the tube. The coffee beans must necessarily be at a greater distance from the reflecting tube than the sector disk 11. Therefore the sector disk reflects a greater amount of light into the tube if it is of the same color as the coffee beans. To obtain a balance it is necessary that the sector disk be somewhat darker in color than the coffee beans, the difference in color being dependent on the relative distances of each from the reflecting tube.

By changing the distance of the sector disk 11 from the mouth of the reflecting tube 29, it is possible to make a balance occur at various shades of color, without changing the color of the sector disk. For this purpose the sector disk is mounted on a bushing 35 which is free to slide along the shaft 20, but has a longitudinal groove engaging with a key 36 on the shaft and rotates with it. The bushing 35 is free to rotate within a collar 38 to which is attached a rack 39, the collar and bushing being compelled to move lengthwise of the shaft 20 in unison. The rack 39 meshes with a pinion 40 which is controlled by a hand knob and dial 41. The setting of this dial will indicate the position of the sector disk with respect to the reflecting tube and consequently the color shade at which a balance occurs. With the sector disk near the mouth of the reflecting tube, a balance is obtained when the coffee beans have reached a light color. As the sector disk is moved away from the tube a balance is obtained at a relatively darker color. It is assumed that the layer of coffee beans or other product under examination is maintained at a fixed distance from the end of the tube 29. It will be seen that by making the shaft sections 16, 16a extensible relative to one another the unknown color surface, namely the layer of coffee beans on the belt 5, can be moved relative to the tube 29 and the light sensitive element, thereby securing the same result as the adjustment of the rotating sector disk 11 by manipulation of the hand knob 41.

To determine when the pulsating or alternating component of the photocell current drops to zero or is reversed, the amplified photocell current is led to a rectifying commutator 45, which has a pair of segments for every sector blade. This commutator is mounted on the same shaft 20 as the sector disk 11 and rotates in synchronism with the disk. Proper setting of the brushes on the commutator 45 will rectify the output of the amplifier 32. The direct current output of the commutator is applied to relays 46 and 48, through a filter 49 and a zero center ammeter 50. The direction of the current supplied to these relays will then depend on the phase of the photocell current. Reversal of the phase of the photocell current will cause reversal of the current through the relays. An important advantage of this arrangement is that the synchronous commutator 45 acts as a very efficient filter in preventing any stray alternating current picked up by the amplifier, or oscillations generated by the amplifier, from operating the relays. A synchronous commutator rectifies only alternating current which is synchronized with its rotation.

The zero center ammeter 50 and signal lamps W, G and R constitute the means employed to signal the operator that the roasting process is complete. The lamps W, G and R should be of different colors, and may be, respectively, white, green and red. The lamps W and G are connected in series across a battery 51. During operation of the equipment, both relays are energized and the needle of the ammeter 50 is near full scale reading when the roasting process begins. Connections are made so that the armature of the polarized relay 48 then makes contact to short circuit the lamp G, the contacts of relay 46 also being closed. The pilot lamp W will then burn alone at full brilliancy. As the roasting process nears completion, the ammeter needle will move toward zero. When a low value of current has been reached the contacts of relay 46 will open and the lamps W and G will burn at reduced brilliancy. This is an indication that the roasting process is nearly complete, the exact moment of completion being when the ammeter needle passes through zero. At this point the armature of the polarized relay 48 will swing over to close the other set of contacts to the lamp R. However, the lamp R will not light until the current has passed through zero and reached a sufficiently high value in the opposite direction to again close the contacts of relay 46. This is an indication that the roasting has progressed too far.

Thus the ammeter 50 supplements the signalling functions of the lamps W, G and R, giving a quantitative indication of the difference in color between the coffee at any instant and the exact shade to which it should be roasted. This indication is quantitative only when the color differences are not too great. Large color differences will saturate the amplifier, producing a constant reading on the ammeter.

As the amplifier 32 is intended for amplification of one frequency only, namely, the frequency of light diversion caused by rotation of the sector disk, it includes a band pass filtering unit or units which will pass this frequency and suppress all other frequencies. Thus frequencies caused by irregularities in color of any individual color surface being measured, or stray amplifier pickup and oscillation, are reduced or eliminated. The frequency of light diversion is therefore accentuated by electrical resonance in the built in filter of the amplifier, to give an output of much smoother waveform and of greater amplitude than would be possible without the filter. Such a filter is most conveniently made by selecting the units of capacitance and inductance ordinarily used with any amplifier to accentuate the desired frequency rather than to uniformly amplify a wide band of frequencies. If desired a separate band pass filter can, of course, be used, either before or after the amplifier. Such filtering means, whether used within or without the amplifier, is for the sole purpose of increasing the sensitivity of the color indication.

It will be appreciated that the photocell, when used to measure the color of any individual area, necessarily gives an indication of the average color of that area, regardless of the uniformity or non-uniformity of that area, since it responds to the total amount of reflected light. The individual light and dark beans in the layer of coffee beans passing underneath the photocell not only present individual color areas which are non-uniform in color, but also cause each individual color area to differ appreciably in average color value. As explained, the irregularities in any individual color area cause frequencies which are suppressed by the filtering action of the amplifier 32 and its associated filter. The output of the amplifier is then a smooth wave whose amplitude is indicative of the average color value of the particular area reflecting light to the photocell at that instant. But as the haphazard distribution of light and dark beans passing underneath the photocell also changes the average color value of the measured areas there will be a variation in the output of the amplifier. This variation will cause erratic movement of the needle of the ammeter 50, and of the relays 46 and 48, to seriously limit the usefulness of the invention. But by employing the low pass filter 49 it was found possible to average the amplitude of the output of the amplifier so that the color indications were smoothed out to give an indication of the average color that had passed underneath the photocell during the last 5 or 10 seconds.

The variations in the output of the amplifier are caused not only by differences in the color of the individual beans, but also by irregularities in the height of the layer and by irregular configuration of beans with their flat or rounded sides uppermost, the flat sides reflecting more light than the rounded sides.

These variations are most irregular in magnitude and duration, with periods up to about 8 seconds and completely prevent all predictions of the effectiveness of using a filter to give an average color value. In addition, it is well known that a time delay exists between the input and the output of a filter. It is necessary for successful use of the filter 49, that the color indications supplied by the instrument do not lag too much behind the color phase passing underneath the rotating sector disk since otherwise the coffee roaster could not be controlled by the color indication. If a filter sufficiently large to give the proper smoothing action causes too great a time delay it should not be used.

However, it was found by experiment that by using capacitances of the order of 500 microfarads and inductances ranging up to 1000 henries, satisfactory results could be secured, although the time delay in the color indications was slightly objectionable, being of the order of 5 seconds.

While this specific type of filter has proved satisfactory, it will be understood, that any other type of filter, mechanical or electrical, which will function to average the color indications without creating an impractical time delay, can also be used.

The reliability of this signalling arrangement in indicating the presence of any defect in the apparatus will be apparent. Normally when the ammeter needle indicates unroasted coffee the pilot lamp W should burn alone. When the ammeter needle drops to zero the lamps W and G should burn at reduced brilliancy. Finally when the ammeter needle swings past the zero to indicate over roasted coffee lamps W, G and R should burn. A defect in the signal lamps or the relay circuits will be indicated by a lack of coordination between the movement of the ammeter needle and the lighting of the signal lamps.

Failure of any other part of the system, such as the motor 13, light source 25, photocell 31, amplifier 32, commutator 45, or any electrical connection will either cut off the pulsations of reflected light reaching the photocell or in some other way prevent rectified current from passing through the ammeter 50 and the relays 46 and 48. A definite distinction can be made between the normal movement of the ammeter needle to zero as a color balance is reached, and its movement to zero when caused by failure of some part of the system. The normal movement is characterized by irregular motion of the needle at the zero point and also by the fact that the needle continues to swing past the zero.

It is characteristic of coffee roasted in an apparatus as described that the coffee beans will continue to darken in color for some time after the gas flame is turned off and the cooling water turned on. For this reason the color balance will always be passed during normal operation, although the roasting equipment is shut down as soon as the color balance is reached.

It is, therefore, the duty of the operator to see that the pilot lamp W is always burning and to watch the ammeter needle as it passes through zero. He should also see that the signal lamp R goes on shortly after the signal lamp G. With these precautions the coffee is definitely safeguarded against over-roasting or burning due to the failure of the apparatus to function.

The relays 46 and 48 can obviously be used to operate suitable mechanism (not shown) for automatically controlling the gas flame and the cooling water in the roasting equipment. Furthermore, a series of interconnected relays with a retarded element can be employed to shut down the equipment under conditions of failure which cause improper operation of the signal lamps, as above described.

Since the sector disk 11 and the coffee beans are illuminated by the same beam of light, a change in the intensity of the beam either at the source or at any reflecting or refracting surface, will not cause any change in the relative amounts of light projected upon the sector disk and upon the layer of coffee. Likewise the relative amounts of reflected light from the sector disk and the coffee beans which eventually reach the photocell are not affected by the efficiency of transmission through the tube, or by reflection from the mirror 28, or absorption in the filter 30. Any stray light which may fall on the photocell cannot affect the results, because it will not be in phase with the rotation of the sector disk 11. Variations due to these causes, or to a change in the overall sensitivity of the photocell will change the amplitude of the photocell current, but this is immaterial because the apparatus is primarily intended to detect reversal of phase of the photocell current.

It is well known that the spectral sensitivity of a photocell, or its relative response at various wavelengths of light will vary from time to time. Therefore it is important to provide a sector disk with a color surface having substantially the same relative reflecting power at all wavelengths of light as properly roasted coffee. Then a variation in the spectral sensitivity of the photocell cannot cause a change in the point at which a color balance occurs. Each wavelength of light reflected from the sector disk and from the layer of coffee beans can then be assumed to be respectively balanced as regards its effect in producing pulsations in the photocell. Balancing the effect of one color against another, as happens when the sector disk and the coffee beans have different spectral reflecting powers, will result in a shift in color balance when the spectral sensitivity of the photocell changes. A variation in the spectral quality of the light emitted by the source, or the selective absorption or reflection of light in any part of the apparatus, will not cause a shift in color balance when a properly colored sector disk is used. For these reasons the adjustment of the apparatus to respond at a certain color shade is permanently fixed with a high degree of accuracy by the color of the sector disk 11 and the adjustment of the dial 41. The precision of the response will depend on the amplitude of the current supplied to the relays 46 and 48 and the ammeter 50 as the color balance is reached. Greater precision than is required for any practical purpose can be secured by the use of a powerful light source, a sensitive photocell and a high gain amplifier.

The great sensitivity of the apparatus to color differences is due in a large measure to the arrangement of the light source 25, mirror 28 and reflecting tube 29, which results in an efficient transfer of light to the photocell. Practically all of the light collected by the condensing lens 26 falls upon the sector disk and the layer of coffee beans. Likewise a large percentage of the reflected light is collected by the reflecting tube and transmitted to the photocell.

In the event that the color of the sector disk does not exactly match the color of properly roasted coffee beans, the color filter 30 placed in front of the photocell 31 may be used to minimize the effect of a shift in spectral sensitivity on the color balance, as previously described. Variations in the spectral sensitivity of commonly used photocells occur mostly at the blue end of the spectrum. If the filter 30 is selected to absorb this band of wavelengths, the disturbing effect will be minimized or eliminated. Since it is possible to obtain a fairly close match to the color of coffee beans, the color filter 30 is usually not necessary to secure permanence of adjustment.

From the above it is evident that the use of a sector disk having substantially the same spectral reflecting power as the color shade or mixture to be detected is an important feature of the invention. The presence of gloss or mirror reflection at the surface of the sector disk 11 will reflect light into the tube 29 and is not desirable in this application of the instrument, as it interferes with the selection of a proper color shade for the sector disk. It is usually advisable to employ a sector disk with a corrugated surface having a very dull finish to reduce the effect of gloss.

In setting the dial 41 so that the dial readings will correspond to known color shades, a primary standard of color surface can be placed beneath the sector disk. When the position of the sector disk is adjusted to obtain a color balance with the primary standard, the dial reading will correspond to the color shade of the standard. The various shades of color to which different grades and sizes of coffee beans should be roasted may be established on a scale of color difference as determined from the dial setting for the primary standard. Thus it is possible to obtain exactly similar results with a number of coffee roasters, by calibrating the dial of each instrument as described. While this scale of color difference is purely arbitrary, being dependent largely upon the sector disk and upon the dimensions and spacing of the various parts of the apparatus, it is eminently satisfactory for the present purpose.

In some applications of the invention it may be desirable to operate the apparatus over a wider range of color balance than a single sector disk will substantially match in spectral reflecting power, or than is conveniently obtainable by adjustment of the dial 41. In this case sector disks of different colors may be readily substituted on the bushings 35 to extend the range of the instrument.

As the material or product being tested is illuminated and viewed at right angles to the plane of its surface, the normal reflecting power of the unknown surface will determine the color balance. Obviously the invention may be used for precise testing of any material for normal reflecting power, within the range of spectral reflecting power and overall reflecting power covered by the sector disk and its adjusting means. Various samples of roasted coffee beans, or samples of any material or product which does not differ widely in color, may be accurately and quickly compared by placing them underneath the sector disk and noting the dial settings required for color balance in each case. The apparatus is of particular value as a colorimeter where color differences are imperceptible to the eye or to other types of colorimeters and may be employed to indicate the quality, grade, purity or other properties of a product or material. It has been found that color differences one-hundredth of the smallest difference discernible to the eye can be easily and accurately measured, without any great refinement in the design of the apparatus.

The range of usefulness of the instrument, when used to compare samples of the same product, can be considerably increased by providing a series of monochromatic color filters to be used in place of the filter 30. As a monochromatic color filter transmits only a narrow band of wavelengths, color balances can be obtained at a number of wavelength bands to determine the exact shades of color in which the given samples differ. The function of a monochromatic filter is to be distinguished from the function of filter 30, which acts as a band absorption filter to minimize the effect of a shift in the spectral sensitivity of the photocell, as above described. While the apparatus does not furnish measurements on an absolute or scientific scale unless duly calibrated by reference to primary color standards, it does provide an extremely precise and convenient method of establishing small differences between similarly colored samples.

While the specific arrangement of the elements described constitutes a satisfactory embodiment of the invention, it will be appreciated that a variety of changes can be made in both the elements employed and in their arrangement, to produce equivalent results without departing from the spirit of the invention. Various means may be employed to alternately expose a photocell to reflected light from a color surface under test and from a standard comparison surface of substantially the same spectral reflecting power.

Adjustment of the color balance may be obtained by moving the tested surface instead of the sector disk. In some applications of the invention it may be permissible or desirable to omit the reflecting tube. The invention is, therefore, not to be construed as limited to the particular organization shown, but is to be accorded the full range of equivalents comprehended by the accompanying claims.

From the foregoing it will be seen that the invention provides a very simple and easily adjustable, but extremely accurate and reliable means of detecting a definite color phase, and of measuring differences in color. As such it may be applied in any case where it is necessary to determine the reflecting power of any surface with respect to a standard surface.

I claim as my invention:

1. Apparatus for the comparison of color surfaces, comprising a light sensitive electrical element the output of which varies in accordance with the amount of light projected thereon, a rotating sector disk having a standard color surface on one side, a source of light, a reflecting tube directing light from said source against the standard color surface of the said sector disk, means for supporting a second color surface adjacent to the other side of the said sector disk, a mirror disposed intermediate one end of the said reflecting tube and said light source and directing to said light sensitive element the light reflected into the said tube from the said color surfaces, and means for detecting pulsations in the output of said light sensitive element.

2. Apparatus for the comparison of color surfaces, comprising a light sensitive electrical element the output of which varies in accordance with the amount of light projected thereon, a rotating sector disk having a standard color surface on one side, a source of light, a reflecting tube directing light from said source against the standard color surface of the said sector disk, means for supporting a second color surface adjacent to the other side of the said sector disk, a mirror disposed intermediate one end of the said reflecting tube and said light source and directing to a light sensitive element the light reflected into the said tube from the said color surfaces, means for varying the distance of one color surface from said reflecting tube, and means for detecting pulsations in the output of the said light sensitive element.

HENRY LEHDE.